United States Patent [19]

Amarantos

[11] 4,087,105
[45] May 2, 1978

[54] HYDRAULIC POWERED BICYCLE

[76] Inventor: John G. Amarantos, 6114 Gardenia Ave., Long Beach, Calif. 90805

[21] Appl. No.: 796,488

[22] Filed: May 12, 1977

[51] Int. Cl.² .............................................. B62M 1/12
[52] U.S. Cl. ..................................... 280/216; 280/234
[58] Field of Search ............... 280/214, 215, 216, 230, 280/233, 234

[56] References Cited

U.S. PATENT DOCUMENTS

| 3,729,213 | 4/1973 | Hudspeth et al. | 280/216 |
|---|---|---|---|
| 3,811,704 | 5/1974 | Gregoric | 280/216 |
| 3,850,448 | 11/1974 | Stewart | 280/216 |

*Primary Examiner*—Richard A. Bertsch
*Assistant Examiner*—Michael Mar
*Attorney, Agent, or Firm*—William C. Babcock

[57] ABSTRACT

A bicycle that is powered by a hydraulic motor operatively associated with the rear wheel of the vehicle, with the actuation being by fluid under pressure delivered to the motor by a first rotary pump actuated by the feet of the rider, and a second pump that is energized by reciprocal up and down movement of the handle bars of the vehicle. The first and second pumps may be operated either independently or jointly. The bicycle includes a reservoir for hydraulic fluid and an accumulator for hydraulic fluid that is maintained in a pressurized condition therein. A manually operated, multiposition valve mounted on the vehicle permits the rider to control the flow of the hydraulic fluid. When the valve is in a first position and either the first or second pump actuated, hydraulic fluid is drawn from the reservoir, discharged through the motor to rotate the rear wheel of the vehicle, and the fluid thereafter discharged back to the reservoir. When the bicycle is coasting downhill, and the valve is placed in a second position, the motor temporarily acts as a pump, and forces hydraulic fluid into the accumulator and be pressurized therein. Pressurized fluid from the reservoir is released to discharge to the motor to rotate the latter and the rear wheel of the vehicle, when the valve is placed in a third position. A manually operated throttle valve controls the flow of hydraulic fluid from the discharge opening of the pump prior to the fluid returning to the reservoir. The throttle valve is normally open, but as it is gradually closed by the rider, the throttle valve restricts the flow of fluid discharging from the motor and as a result the motor acting as a brake to slow down the movement of the bicycle. When the throttle valve is completely closed, fluid cannot discharge from the motor, and the rear wheel cannot rotate relative to the frame of the bicycle and will actually skid on the supporting surface.

3 Claims, 5 Drawing Figures

HYDRAULIC POWERED BICYCLE

BACKGROUND OF THE INVENTION

1. Field of the Invention
Hydraulic Powered Bicycle
2. Description of the Prior Art In the past, bicycles have in the main been driven by sprocket and chain assemblies, which assemblies as is well known require substantial maintenance and are a source of trouble.

A major object of the present invention is to provide a hydraulically operated bicycle that is free of sprockets and chains, one that operates in a substantially trouble-free manner, requires a minimum of maintenance, and is adapted to store energy when coasting downhill or in an inclined surface that may be subsequently used when driving the bicycle.

SUMMARY OF THE INVENTION

A bicycle that includes an elongate frame that pivotally supports a fork and handle bar assembly on the forward end thereof, and the fork rotatably supporting a front wheel. A hydraulic motor is supported from the rear of the frame, and the motor serving as the hub of a rear wheel. A hydraulic fluid reservoir and accumulator are disposed in a fixed position relative to the frame of the bicycle, which frame also supports a seat for the rider.

A first hydraulic fluid pump is secured to the bicycle frame, with the motor including a pair of pedal supporting cranks that may be driven by the feet of the rider. A multi-position, multi-port valve is mounted in a fixed position on the bicycle frame and may be shifted from one position to another by a first lever pivotally supported on the handlebars of the vehicle.

A second hydraulic pump of the reciprocating type is so mounted on the bicycle as to be actuated by up and down movement of the handlebars, which handlebars are pivotally supported from the upper portion of the fork. A normally open spring loaded throttling valve controls fluid discharge of hydraulic fluid from the hydraulic motor, and the position of the second valve being controlled by a second lever pivotally supported from the handle bars of the vehicle. As the throttling valve is moved towards a closed position the back pressure on hydraulic fluid in the motor builds up, and the motor then acts as a brake to slow down the forward movement of the vehicle. The first and second pumps, the first and second valves, the reservoir, and the accumulator are all interconnected by suitable conduits.

When the vehicle is coasting downhill, the first valve may be shifted to a position where the discharge of fluid from the first pump is to the accumulator, and this fluid being pressurized due to the motor temporarily acting as a pump. After the bicycle is on a level stretch of surface, the first lever may be used to move the first valve to a position where pressurized fluid discharges to the motor to propel the vehicle.

DESCRIPTION OF THE PREFERRED EMBODIMENT

Figure 1:
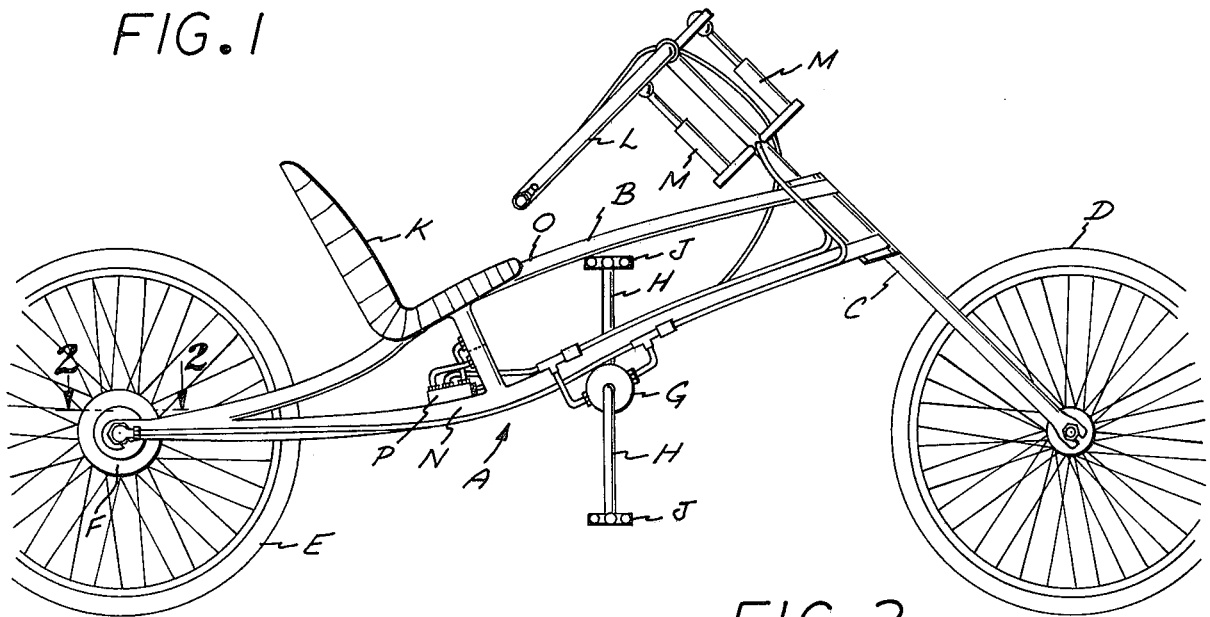
FIG. 1 is a side elevational view of the hydraulic motor powered bicycle.
Figure 3:
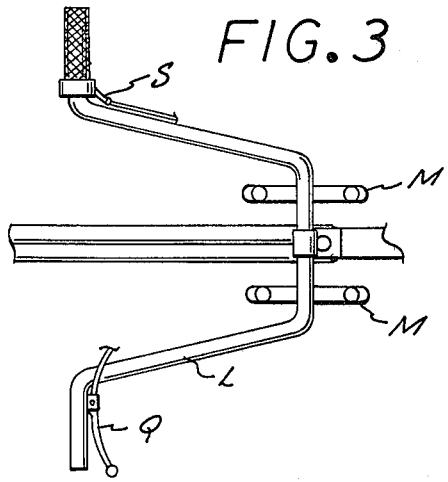
FIG. 3 is a fragmentary top plan view of the forward portion of the bicycle.
Figure 2:
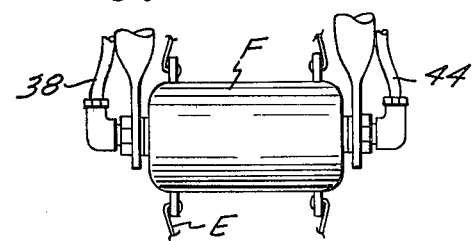
FIG. 2 is a fragmentary top plan view of a rear wheel portion of the bicycle taken on the line 2—2 of FIG. 1.
Figure 4:
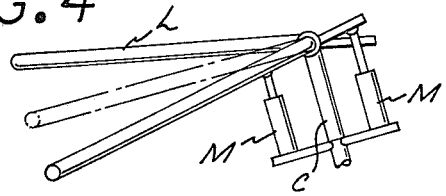
FIG. 4 is a fragmentary side elevational view of the handle bar and second pump assembly.
Figure 5:
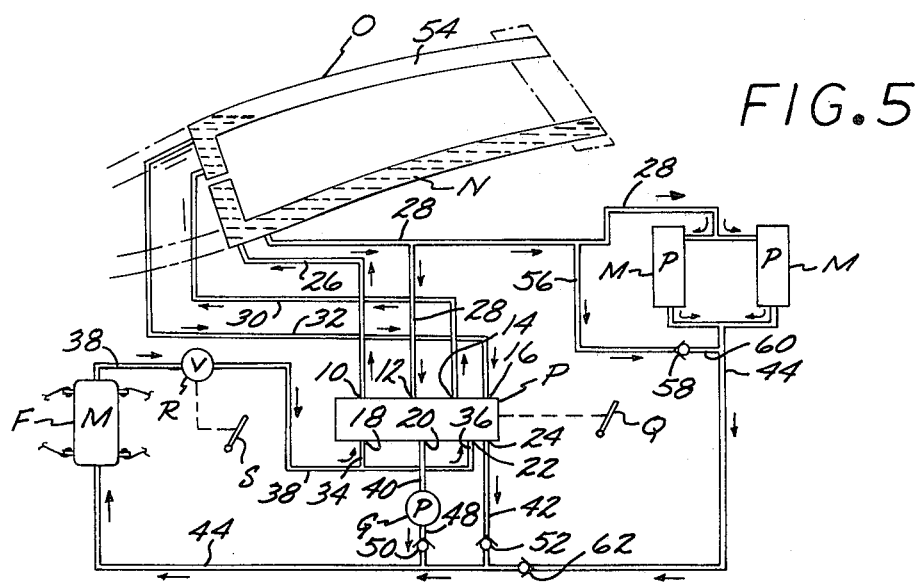
FIG. 5 is a diagrammatic view of the hydraulic system.

The bicycle A of the present invention is shown in FIG. 1 and includes an elongate tubular frame B, which on the front end thereof pivotally supports a fork C. The fork C rotatably supports a pneumatic tired front wheel D.

A rear pneumatic tired wheel E is provided that is of the conventional wire spoked type and has a hydraulic motor assembly F as the hub thereof. A first hydraulic pump G is mounted at substantially the lower central portion of the frame B. The pump G is driven by a pair of oppositely disposed cranks H that have pedals J pivotally supported from the free extremities thereof. A seat K is mounted on the upper portion of frame B on which a rider (not shown) is supported, with the feet of the rider contacting the pedals J to drive the first hydraulic pump G.

Conventional handle bars L are pivotally secured for up and down movement relative to the upper portion of fork C. The handle bars L are not pivotally movable relative to the fork C in a horizontal plane, and in this regard serve their normal function of pivoting the fork C and front wheel D to guide the bicycle.

A second hydraulic pump assembly M is provided that is of the reciprocal type, and is so secured to the fork C and handle bars H as the latter is pivoted upwardly and downwardly by the hands (not shown) of a rider (not shown).

A hydraulic fluid reservoir N and hydraulic fluid accumulator O are provided and preferably formed as a part of the frame B. A multi-position, multi-port first valve P is mounted on frame B and is selectively moved from position to position by manual manipulation of a first lever Q pivotally supported from the handle bars L. A spring-loaded, normally open second valve R is provided to control the flow of hydraulic fluid from motor F, with the valve R capable of being actuated to regulate the back pressure on the motor F, and thus serving to brake the rotation on rear wheel E. When second valve R is completely closed, the rear wheel E cannot rotate relative to frame B, and the rear wheel will actually slide on the supporting surface. Second valve R is controlled by a second lever S pivotally supported from the handle bars L.

The first valve P has first, second, third, fourth, fifth, sixth, seventh and eighth ports 10, 12, 14, 16, 18, 20, 22 and 24 respectively. First port 10 is connected by a conduit 26 to the interior of reservoir N. The second port 12 has a conduit 28 extending therefrom that is in communication with the interior of reservoir N and the intake to second pumps P. Third port 14 is in communication with the interior of accumulator D by a conduit 30. The fourth port 16 has a conduit 32 extending therefrom to the interior of accumulator O.

Fifth and eighth ports 18 and 24 are connected by conduits 34 and 36 that are in communication with a conduit 38 that extends to the discharge of motor F. Conduit 38 has second valve R therein. Sixth port 20 is connected by a conduit 40 to the suction opening in first pump G.

The eighth port 24 is connected by a conduit 42 to a conduit 44, which last identified conduit is connected to both the discharge of second pump M and the inlet opening to motor F. The discharge of pump G is connected by a conduit 48 to conduit 44. Conduits 48 and 42 have check valves 50 and 52 therein.

When first pump G is driven and first valve P is disposed in a first position hydraulic fluid flows from reservoir N through conduits 28 and 40 to the suction side of first pump G to discharge therefrom through conduit 48, check valve 50, conduit 44 to motor F to drive the latter. Fluid after it discharges from pump F flows through conduit 38, second valve R, seventh port 22, first port 10 and conduit 26 to return to reservoir N. When the flow of fluid is restricted through conduit 38 by valve R, a back pressure is built up on fluid in motor F and the rotation of rear wheel E is braked. When first valve P is in the first position second, third, seventh and eighth ports 12, 14, 22 and 24 are closed. By manipulating the handle bars L in an up and down reciprocating movement fluid flows from reservoir N to the suction side of second pump M, and is discharged therefrom under pressure through conduit 44 to motor F to assist in driving the latter.

When the bicycle A is coasting down a hill or inclined surface, and the second valve P is placed in a second position, the motor F temporarily acts as a pump to discharge hydraulic fluid through conduit 38, second valve R which open, conduit 38, seventh port 22, third port 14, conduit 30 to accumulator O that has an air cushion 54 therein. During this time, hydraulic fluid flows to the motor F that is temporarily acting as a pump from reservoir N through conduit 28, conduit 56, check valve 58, conduit 60, conduit 44 and check valve 62. The first valve P when in the second position, has all of the ports closed except those necessary to establish the above described flow.

After hydraulic fluid has been pressurized in accumulator O and the bicycle A is on a level stretch of road, the first valve P is placed in a third position, with pressurized fluid flowing from accumulator O through conduit 30, fourth port 16, eighth port 24, conduit 42, check valve 52 and conduit 44 to motor F to actuate the latter and drive the bicycle A without the user (not shown) actuating the first pump G or second pump M. Fluid after discharging from motor F flows through conduit 38, second valve R that is in the open position, conduit 40, fifth port 18, first port 10 and conduit 26 to reservoir N. After the pressurized fluid in accumulator O has been expended, the valve P is returned to the first position, with hydraulic fluid being supplied to motor F by use of first pump G or second pump M either individually or jointly.

The use and structure of the invention has been described previously in detail and need not be repeated.

What is claimed is:

1. A bicycle of the type that includes an elongate frame having a forward and rearward end, a fork pivotally supported from said forward end, a forward wheel rotatably supported by said fork, a seat supported on said frame for a user, and said bicycle being characterized by:
    a. a rear wheel assembly that has a hydraulic motor for a hub, with said hydraulic motor supported from said rearward end of said frame;
    b. a first hydraulic fluid pump supported from said frame;
    c. first means for manually driving said first pump by the action of the feet of said user;
    d. handle bars pivotally supported for up and down reciprocal movement from said fork;
    e. a second hydraulic pump that is driven by reciprocal up and down movement of said handle bars;
    f. a hydraulic fluid reservoir supported from said frame;
    g. a hydraulic fluid accumulator supported from said frame;
    h. a multi-position, multi-port first valve supported from said frame;
    i. a first movable lever for manually moving said first valve to a desired one of a plurality of positions;
    j. conduit and check valve means so connecting said ports of said first valve, said first and second pumps, said hydraulic motor, said reservoir, and said accumulator that when said first valve is in a first position hydraulic fluid is supplied to said first and second pumps to be pressurized by the actuation of said pumps and delivered to said motor to drive the latter and said rear wheel to propel said bicycle, with said fluid after flowing through said motor returning to said reservoir with said conduit means when said valve is in a second position and said bicycle coasting downhill allowing said motor to temporarily act as a pump to discharge hydraulic fluid from said reservoir to said accumulator to be pressurized by compressing an air cushion maintained in the latter, and said conduit means when said bicycle is on the level and said first valve is in a third position allowing pressurized hydraulic fluid in said accumulator to flow from the latter to said motor to actuate the latter;
    k. a second normally open valve in said conduit means that is so disposed that as it is moved towards a closed position the back pressure on hydraulic fluid in said motor is increased to brake the rotation of said rear wheel; and
    l. a second manually operated lever for manually moving said second valve from said open towards said closed position.

2. A bicycle as defined in claim 1 in which said frame is of tubular structure and said reservoir and accumulator are formed as an integral part thereof.

3. A bicycle as defined in claim 1 in which said first and second levers are movably supported on said handle bars.

* * * * *